United States Patent [19]

Hakoopian et al.

[11] Patent Number: 4,757,465

[45] Date of Patent: Jul. 12, 1988

[54] DIGITAL INTERPOLATOR FOR SELECTIVELY PROVIDING LINEAR INTERPOLATION BETWEEN SUCCESSIVE DIGITAL DATA WORDS

[75] Inventors: Hakoop Hakoopian, Lake Grove; Peter J. Mackey, Hicksville, both of N.Y.

[73] Assignee: Harris Corporation, Melbourne, Fla.

[21] Appl. No.: 710,411

[22] Filed: Mar. 11, 1985

[51] Int. Cl.[4] .......................... G06F 1/02; G06F 7/38
[52] U.S. Cl. ..................................... 364/723; 364/718
[58] Field of Search ............................... 364/718–723, 364/768; 318/573; 340/728

[56] References Cited

U.S. PATENT DOCUMENTS

| | | | |
|---|---|---|---|
| 4,263,593 | 4/1981 | Dagostino et al. | 340/728 |
| 4,313,173 | 1/1982 | Candy et al. | 364/723 |
| 4,528,639 | 7/1985 | Edwards | 364/723 |
| 4,536,853 | 8/1985 | Kawamoto et al. | 364/723 |
| 4,593,271 | 6/1986 | Candy | 364/723 |

OTHER PUBLICATIONS

Instruction Manual for Model 175 Arbitrary Waveform Generator, Wavetek of San Diego, California 1978.

*Primary Examiner*—Gary V. Harkcom
*Assistant Examiner*—Long Thanh Nguyen
*Attorney, Agent, or Firm*—Tarolli, Sundheim & Covell

[57] ABSTRACT

The digital interpolator herein selectively provides linear interpolation between successive digital data words in a stream of such data words. The data words each contain a control bit together with first and second multi-bit fields with the control bit having a first or second level respectively designating whether or not interpolation is to take place through that data word. The first bit field contains differential data, representing the value between successive data words, only when the control bit is at a first level. The second bit field contains the interpolation interval to be effective when the control bit is at the second level. When no interpolation through the assigned data point is desired, the control bit is at the first level and the circuitry responds to provide an output signal having a digital value corresponding with a first data word to which there is added the differential data from the first bit field to obtain the next output signal. If interpolation is desired through the assigned data word, then the circuitry responds by repeatedly adding interpolation increment from the second field to the previous output signal for N iterations representing N interpolation increments.

12 Claims, 6 Drawing Sheets

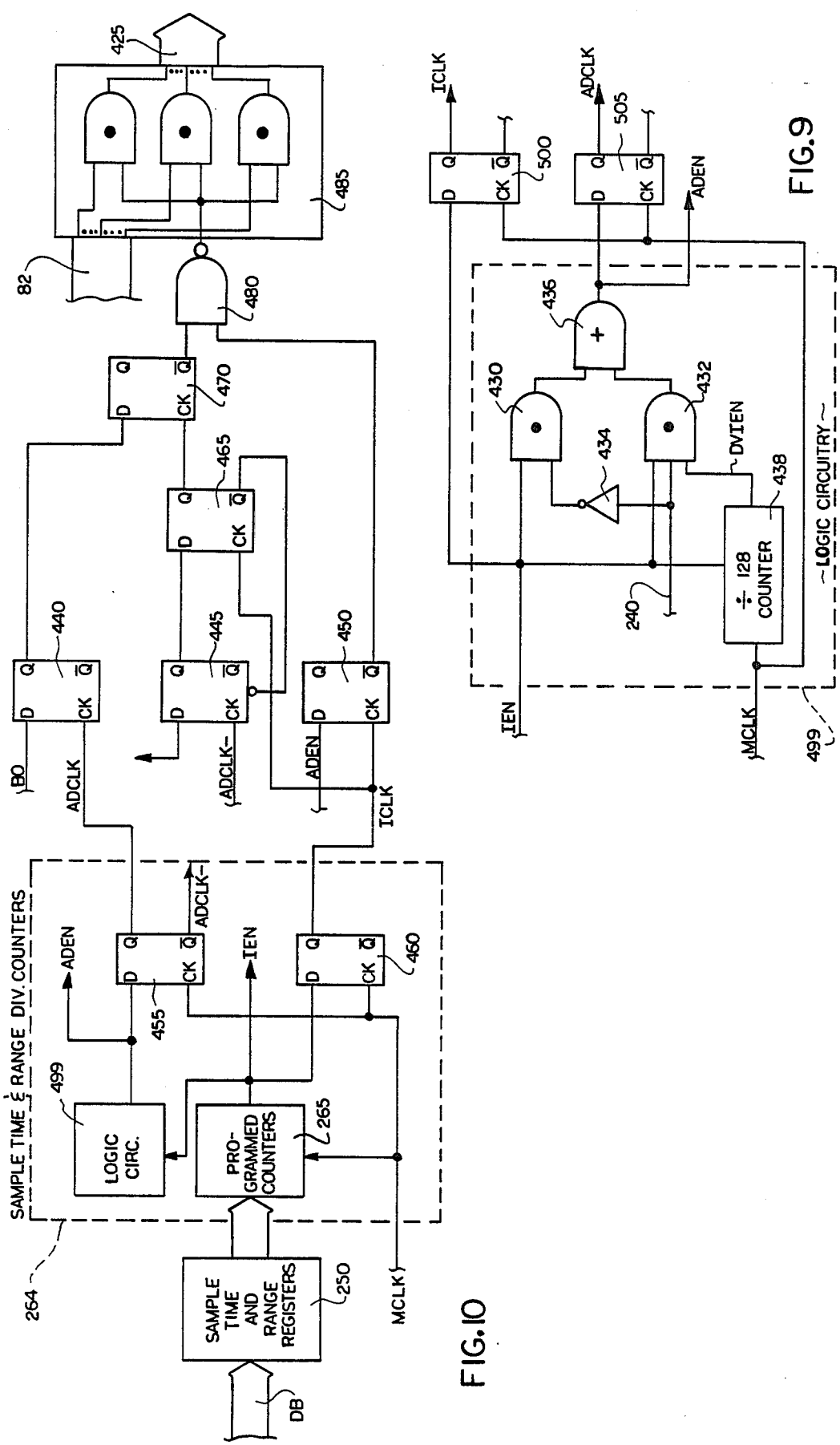

DIGITAL INTERPOLATOR FOR SELECTIVELY PROVIDING LINEAR INTERPOLATION BETWEEN SUCCESSIVE DIGITAL DATA WORDS

BACKGROUND OF THE INVENTION

This invention relates to the art of interpolators and more particularly to a digital interpolator for providing selective linear interpolation between successive digital data words in a stream of such data words.

The digital interpolator is disclosed in conjunction with a waveform generator with the interpolator being employed to provide interpolation between successive data words that are stored and retrieved from a memory. The invention has other applications and may be used in various situations requiring digital interpolation between successive data words in a stream of such data words.

In the prior art it is known to employ interpolators in waveform generator applications to interpolate between stored waveform samples to provide additional samples at the interpolated values. One such example is that illustrated in Dagostino et al., U.S. Pat. No. 4,263,593. The interpolator therein provides interpolation samples between stored waveform samples to provide additional samples at the interpolated values so as to increase the dot density of a dot density display. The stored samples in digital format are first converted to analog form by digital-to-analog converters and then a transversal filter is employed for obtaining the interpolated values. A similar interpolator for a waveform generator is found in a waveform generator provided by Wavetek of San Diego, Calif. in their Model 175 arbitrary waveform generator. This product is described and illustrated in their instruction manual, instrument release D-2, 1980, manual revision May, 1980. Such prior art achieves interpolation in the analog domain and, hence, this results in reduced bandwidth and lower signal-to-noise ratios, since switching transients have to be suppressed.

An interpolator operating in the digital domain is known in the prior art and takes the form of Candy et al., U.S. Pat. No. 4,313,173. The interpolator therein provides circuitry for computing the difference between successive samples, divides the difference by the number of interpolation intervals to form an increment and then repeatedly adds the increment to the last output of the device in order to generate the next output. This interpolation is continuous and has no ability to provide selective interpolation or no interpolation through an assigned data point or sample.

It is sometimes desirable, such as in generation of waveforms, that the interpolation be selective at designated data points or samples. For example, in generating a waveform where within the waveform it is desired to have an immediate step increase between data points, interpolation therebetween would provide a gradual or ramp function instead of an immediate stepwise function. Digital interpolators, such as that disclosed in the Candy et al. patent, supra, are not capable of performing this function. The interpolators which operate in the analog format discussed hereinbefore have reduced bandwidth and low signal-to-noise ratios because switching transients must be suppressed.

SUMMARY OF THE PRESENT INVENTION

It is a primary object of the present invention to provide a digital interpolator for providing interpolation between successive digital data words in a stream of such data words with the operation providing linear interpolation on the fly so as to be providing operation in real time.

A still further object of the present invention is to provide such a digital interpolator that selectively provides or does not provide linear interpolation through assigned digital data words so that in a stream of digital data words interpolation takes place between successive data words and no interpolation will take place through assigned data words within this stream of data words.

This is accomplished in accordance with the present invention by supplying a stream of successive data words, as from a memory or the like, wherein each data word is a multi-bit word having a control bit designating whether or not interpolation is to be made through that data word. The data word includes a first bit field containing the differential value between successive data words only when the control bit is at a first level indicative of no interpolation through the data word. A second bit field contains an interpolation increment to be employed only when the control bit is at a second level indicative that interpolation is to be done through the data word. A multi-bit digital output signal is provided having a value which initially corresponds with the first of the successive data words. Circuitry responds to the next succeeding data word and if the control bit therein is at a first level then the differential value from the first bit field is added to the previous output signal to generate the next output signal having a value corresponding with the first output signal plus the differential value. Otherwise, the interpolated increment is repeatedly added to the first output signal over an interpolation interval until the output signal attains a value corresponding with that of the second of the successive data words.

BRIEF DESCRIPTION OF THE DRAWINGS

The foregoing and other objects and advantages will become more apparent from the following detailed description of the drawings which are a part hereof and wherein:

FIG. 9 is a schematic-block diagram illustration of the clock select logic circuit employed in FIG. 8; and FIG. 10 is a schematic-block diagram illustration of the disable circuit employed in the embodiment of FIG. 8.

DESCRIPTION OF PREFERRED EMBODIMENT

Figure 1:
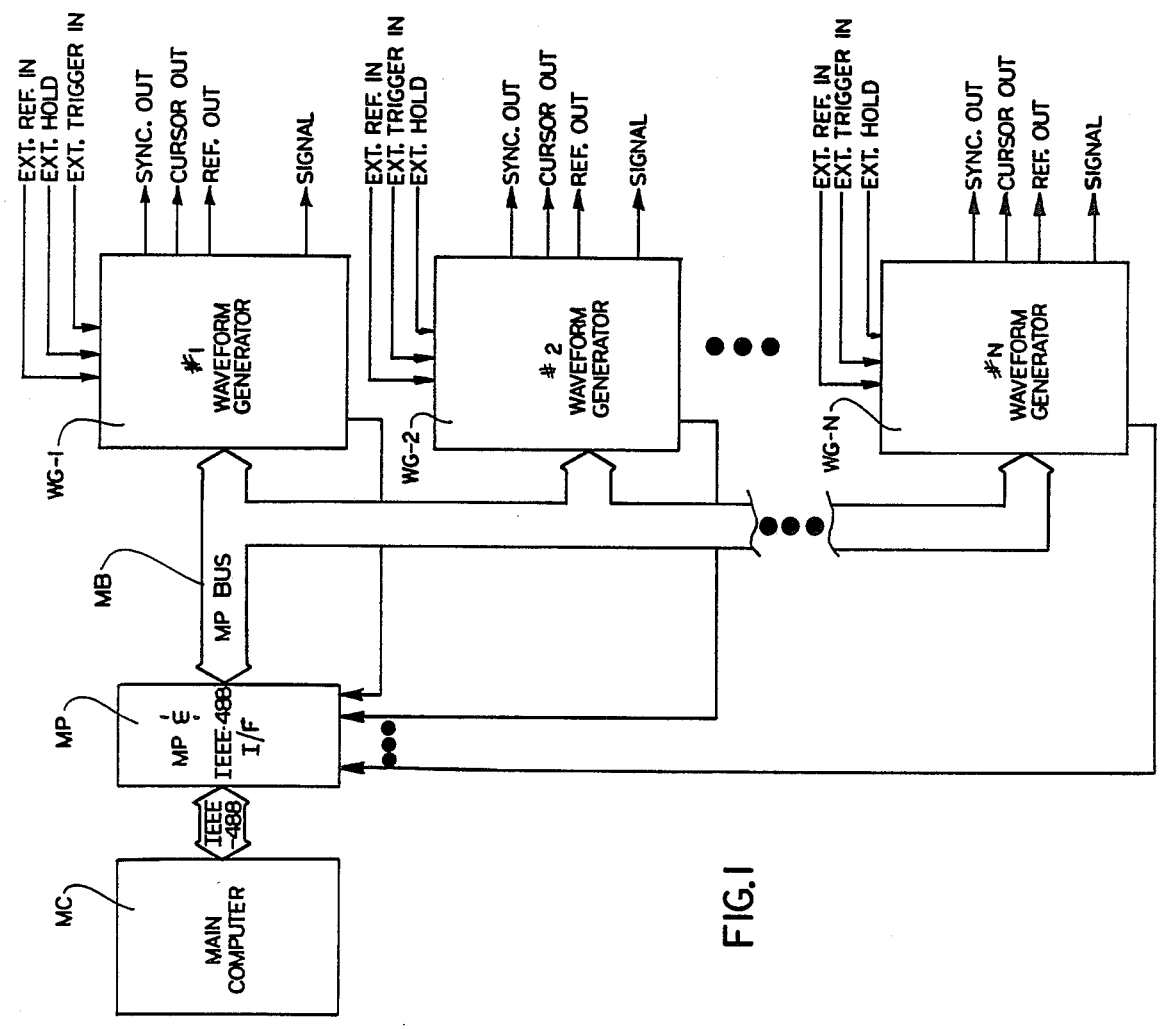
FIG. 1 is a schematic-block diagram illustration of one embodiment of the invention connected to a main computer.

Reference is now made to the drawings and particularly to FIG. 1 which illustrates an arbitrary waveform generator system, interfaced to an IEEE-488 bus structure with a main computer MC, from which data respecting parameters may be received at the system's microprocessor section MP. The system's microprocessor section MP communicates by way of its microprocessor bus MB with one or more waveform generators WG-1, WG-2 through waveform generator WG-N. The waveform generators communicate with the microprocessor section MP by way of this bus MB as well as by microprocessor monitored interrupts. Once the microprocessor section MP has loaded the appropriate data into a waveform generator, that generator will be conditioned to generate the desired waveform and supply an output signal in accordance with the waveform without further control from the microprocessor. Consequently, the microprocessor section may be used with a plurality N of such waveform generators, as is illustrated in FIG. 1.

Each waveform generator, as in the case of generator WG-1, may generate any waveform that can be expressed as a function of time. The waveforms themselves are stored in memory and digitally represented therein on an X-Y (time, amplitude) matrix. Preferably, each waveform is stored as a 256×255 data point matrix with the time or X as the memory address being sequential and the amplitude (memory data at the specified address) being arbitrary varying digital data points. Consequentially by sequentially addressing the memory it will output arbitrary varying digital data. The digitized waveform pattern is outputted from the memory and each data word is converted by a digital-to-analog converter scheme in the waveform generator to provide an arbitrary varying analog signal. That signal is scaled in accordance with a programmed scaling factor and may also be offset in the Y direction by a programmed offset factor within the analog section of the waveform generator. The resultant waveform is output on the SIGNAL output line from the waveform generator for use such as in a testing environment.

Each waveform generator WG-1 through WG-N is capable of providing four fixed waveforms, including sine wave, square wave, triangle and ramp, as well as arbitrary waveforms that have been user programmed and loaded into the microprocessor memory as by way of the IEEE bus. Each waveform, whether it be a fixed waveform or a user programmed waveform, is digitally represented in memory as data points within a 256×255 section of memory which contains a completely defined waveform.

Microprocessor Section

Figure 2:
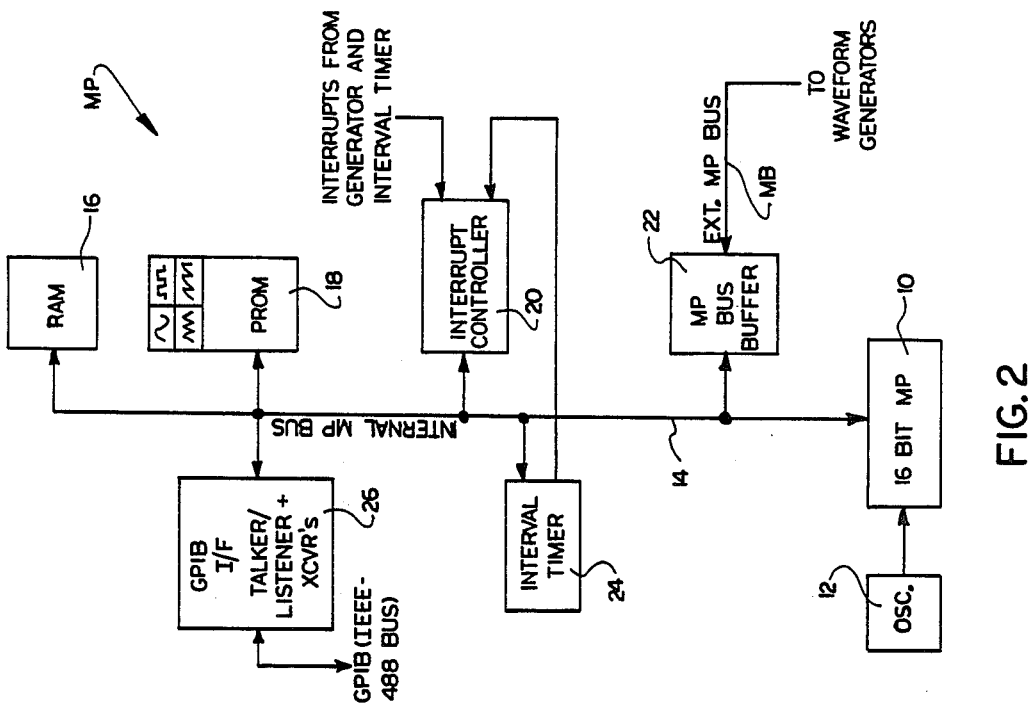
FIG. 2 is a schematic-block diagram illustration of the processor section employed in the preferred embodiment of the invention.

The microprocessor section MP is shown in greater detail in FIG. 2 to which reference is now made. The microprocessor section includes a 16 bit microprocessor 10 which may conveniently take the form of an Intel Model No. 8086 16 bit processor. The processor is supplied with clock pulses as from a crystal controlled oscillator 12. The processor communicates by way of an internal bus structure 14 with a random access memory 16 (RAM), a programmable read only memory 18 (PROM), an interrupt controller 20 and a microprocessor bus buffer 22 by which the microprocessor section communicates with the waveform generators by way of the external processor bus MB. Additionally, the microprocessor 10 communicates by way of its internal bus 14 with an interval timer 24 which is used as by software, for calculating various accurate time delays called for in the program control and supplies interrupts to the interrupt controller 20. A general purpose interface bus (GPIB) controller 26 interfaces between the microprocessor's internal bus 14 and the IEEE-488 bus to the computer MC. The controller 26 is conventional and serves to provide general handshake routines and the like.

Memory 16 has 16K addressable memory locations and is 16 bits wide and serves as a scratch pad memory. Additionally, memory 16 may store user programmed waveform patterns in digital format with each waveform being stored in a block of 256 sequential addresses. The data stored may be supplied by way of the IEEE-488 bus as from the main computer or from another source. Under processor control, the data is written into 256 sequential addresses in the random access memory 16. Memory 16 has 1K of space allocated for four user programmable blocks of waveform patterns (256 locations per block). Additionally, the user programmed block data stored in memory 16 may be accompanied by additional parameters such as a START address word, a STOP address word, a CURSOR address word, an AMPLITUDE control word and a RELAY control word, as well as other parameters to be described hereinafter in conjunction with waveform generation.

The microprocessor programmable read only memory (PROM) 18 has 16K addressable storage locations and is 16 bits wide. Of this, 1K of addressable storage space is allocated for four blocks of 256 words each for storing fixed or preset waveforms defining a sine wave, a triangle wave, a square wave and a ramp wave. These preset waveforms are graphically illustrated in the upper portion of memory 18 in FIG. 2, indicative that only a small portion of the memory contains these preset waveforms. The rest of the memory includes the operating system, self-test programs, as well as application programs. The four blocks of the memory dedicated to the storage of these four preset waveforms (sine, triangle, square and ramp) will respectively be referred to hereinafter as PROM blocks 1, 2, 3 and 4. Similarly, the four allocated storage blocks in memory 16 for user programmable waveforms will hereinafter be referred to as RAM blocks 1, 2, 3 and 4.

Waveform Generator

Figure 3:
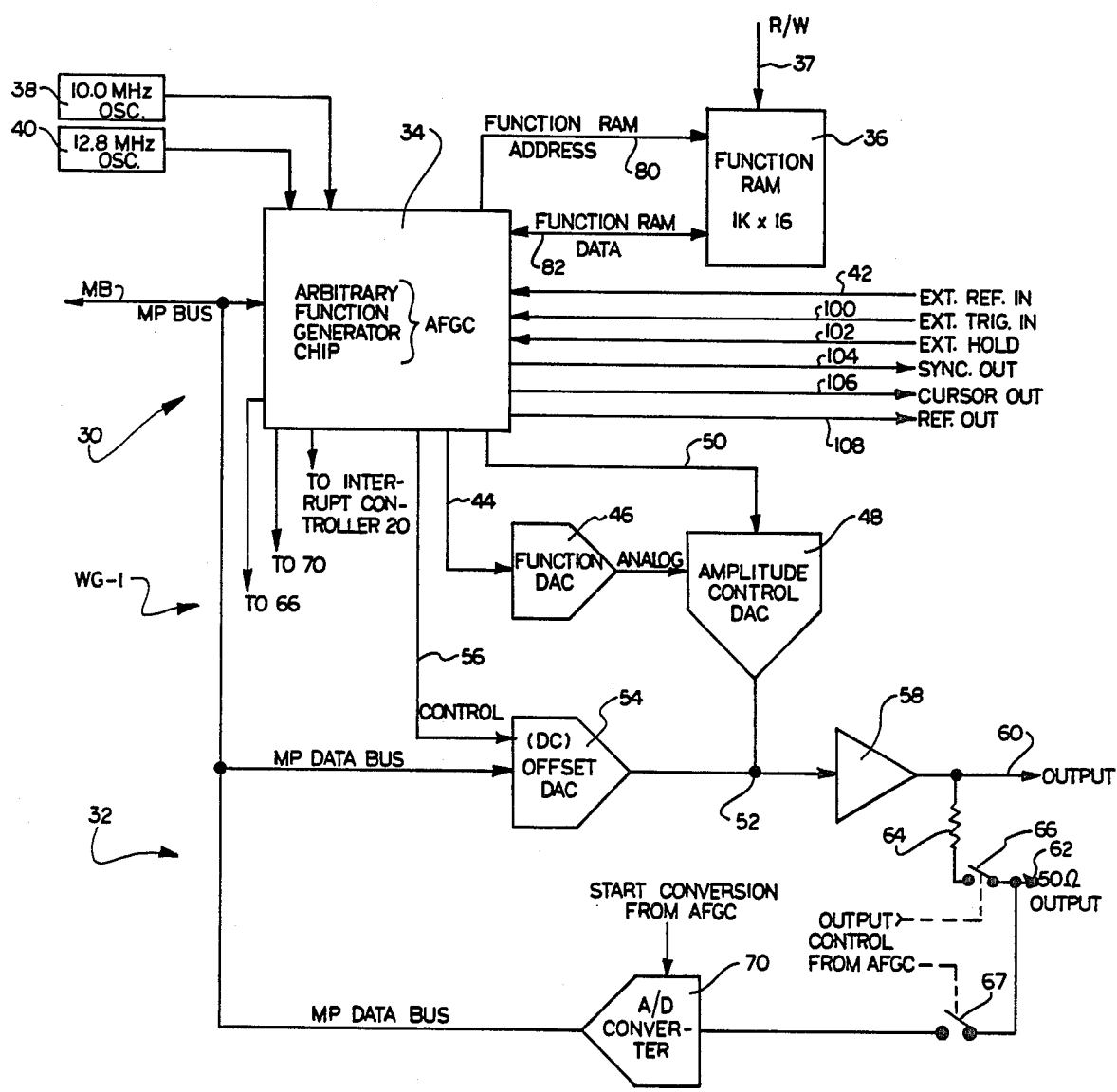
FIG. 3 is a schematic-block diagram illustration of the waveform generator employed in the preferred embodiment of the invention.

Each of the waveform generators WG-1 through WG-N takes the form of waveform generator WG-1 illustrated in FIG. 3 to which attention is now directed. Each waveform generator may be considered as having a digital section 30 and an analog section 32. The digital section 30 includes an arbitrary function generator chip 34, which will be described in greater detail hereinafter with reference to FIG. 4, and a 1K by 16 random access memory 36, sometimes referred to hereinafter as the function RAM. Clocking for the operations is obtained from either a 10.0 MHz oscillator 38 or a 12.8 MHz oscillator 40 or from an external clock source EXT. CLK. sometimes referred to herein as EXT. REF IN on line 42.

The function generator chip 34 communicates with the microprocessor section MP by way of the microprocessor external bus MB and, once the function generator chip has been loaded with appropriate commands and data, it may operate independently of the microprocessor section to generate an arbitrary waveform. Digital data representing each point of the waveform is supplied on a 15 bit bus line 44 to a function digital-to-analog converter (DAC) 46, which in a conventional manner, converts the digital data to a full scale analog signal which is then supplied to a multiplying amplitude control digital-to-analog converter 48. The converter 48 receives scaling digital data from the generator chip 34 by way of an 11 bit bus 50 to scale down the output analog signal in accordance with a programmed scaling factor. This scaled down analog signal is then supplied to a summing node 52 to which a DC offset bias is applied from an offset digital-to-analog converter 54. This digital-to-analog converter 54 includes a register for receiving a 10 bit control word by way of the microprocessor data bus when a write line 56 is raised by the generator chip 34. This DC bias will establish the Y value offset of the waveform from the X axis. The analog signal now with its proper offset bias and scaling is buffered as with an output buffer 58, and is supplied to either a 0 ohm output 60 or a 50 ohm output 62, by way of a 50 ohm resistor 64 under control by the function generator chip 34. Thus, whenever user requirements are such that the output waveform be provided at the 50 ohm output 62, the arbitrary function generator chip 34 outputs a command to switch 66, schematically illustrated in FIG. 3, to close the switch so as to provide the output waveform at the 50 ohm output terminal 62.

The arbitrary waveform generator system is provided with a self-test feature by which the processor may call for examination of the waveform being outputted. In such case, the processor communicates with the arbirary function generator chip which includes an interface decoding circuit which decodes various commands from the microprocessor. During the self-test operation, the arbitrary function generator chip 34 outputs a control command to activate the analog-to-digital converter 70 and to use switch 66 so that the converter supplies a digital representation of the outputted waveform, as seen at the 50 ohm terminal 62, and supplies the digital samples to the microprocessor by way of the microprocessor data bus.

The waveform to be generated is selected from one or more of the PROM blocks or from one or more of the RAM blocks in the microprocessor section and, under processor control, the data points are loaded into the function RAM 36. Once the waveform data has been loaded and the appropriate parameters have also been loaded, the generator chip acts in the form of a counter and sequentially addresses the waveform data points in the function ram 36 by way of a 10 bit function RAM address bus 80. Each waveform pattern is stored as 256 data words representing 256 points on the waveform and these are stored so as to be addressed in sequence and output by way of a 16 bit function RAM data bus 82. Only 15 of the bits represent a data point with one bit being a control bit indicating whether the data point is to be interpolated or not interpolated (a smoothing function). This is interpreted and acted upon internally of the function generator chip 34.

The function RAM 36 is partitioned into four 256 by 16 RAM blocks which will allow loading of each memory segment (256 words) for output to the function digital to analog converter 46. The microprocessor data bus and the function RAM data bus have a point to point correspondence (i.e., bit 0 of the microprocessor data bus and bit 0 of the function RAM data bus are both the least significant bit LSB). In addition to providing addresses for addressing the function RAM 36, the arbitrary function generator chip 34, as will be discussed in detail with reference to FIG. 4, also provides clock generation for the sample times (the time between digital words) over a range from between 0.2 microseconds and 999.9 seconds. Start and stop address parameters are provided to enable operation anywhere between 0 and 1023 (the range of addresses in the function RAM 36). A preset length counter serves to stop operation after a predetermined number of cycles. Also, a digital interpolator may be used to compute intermediate values between each data point to provide a smoothing function.

Figure 4:
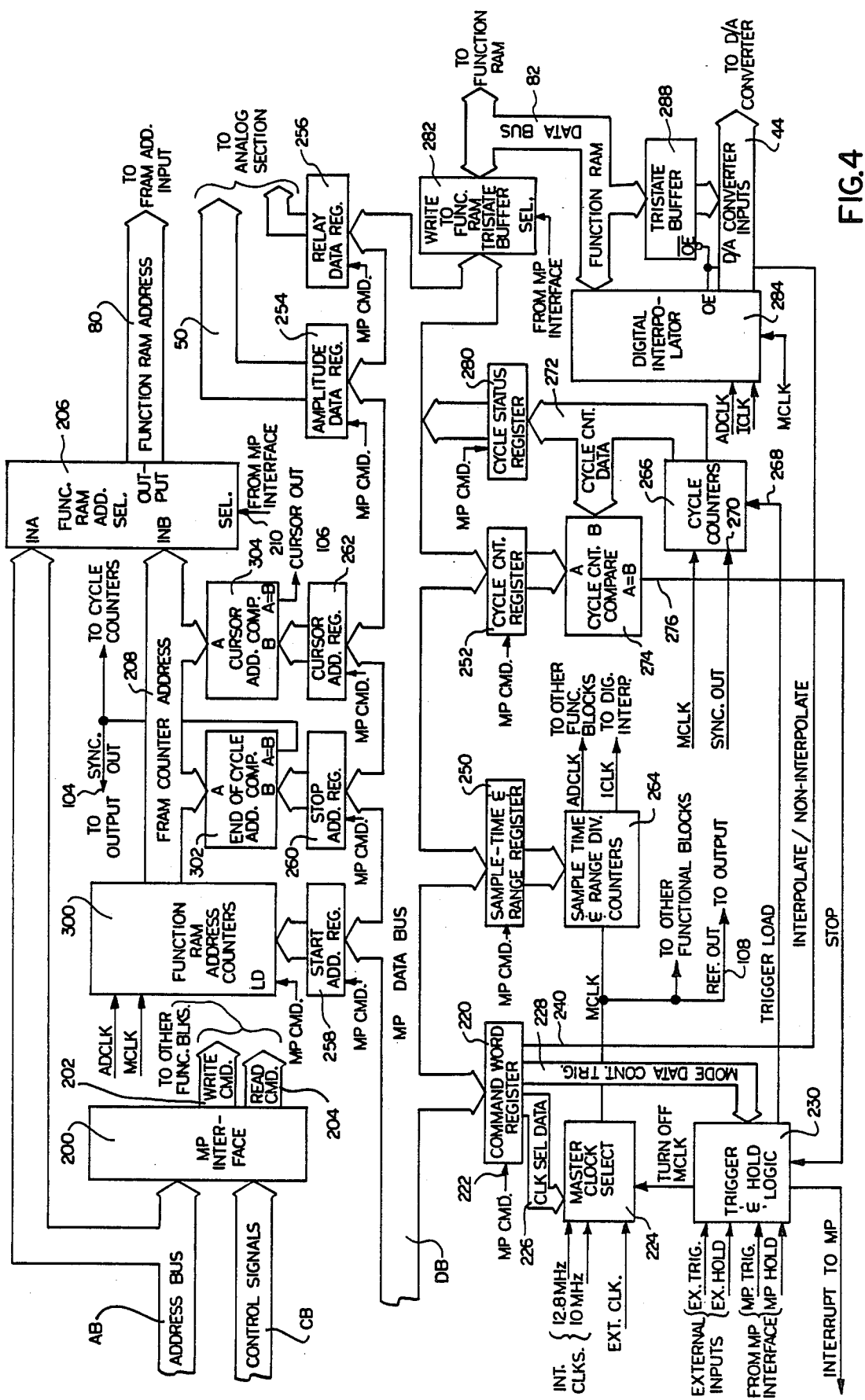
FIG. 4 is a detailed schematic-block diagram illustration of the function generator chip illustrated in FIG. 3.

To assist in the understanding of the detailed description herein relating to the function generator chip 34 as depicted in FIG. 4, it is believed useful to first consider the various modes of operation that are available, as well as the various inputs and outputs labelled in FIG. 3.

There are several modes of operation available. These are dictated by a mode control word supplied to the function generator chip 34 from the processor section MP by way of its external microprocessor bus MB. The mode control word is a 16 bit word and is decoded in the function generator 34 to dictate the mode of operation. The modes include continuous, preset triggered, monitor triggered and hold control. These modes are described below in Table 1.

TABLE 1

| | |
|---|---|
| 1. Continuous | In this mode of operation, the waveform is output continuously at the selected specifications. |
| 2. Preset Triggered | In this mode of operation the waveform generator is quiescent until triggered as by way of the IEEE interface bus or an external trigger which may be user controlled. This is accomplished, for example, by raising the EXT. TRIG IN line 100 as viewed in FIG. 3. After the trigger, a preset number of cycles, up to 9,999, is output at the selected specifications. |
| 3. Monitor Triggered | In this mode of operation, the waveform generator is operated as in mode 2 above, and the output waveform is continuous after being triggered until receiving an external hold (EXT. HOLD) on line 102, see FIG. 3 or until such an input has been received from the IEEE interface bus. Up to 9,999 cycle counts can be read back over the IEEE interface bus. |
| 4. Hold Control | The generated waveform can be stopped, asynchronously to the reference clock, by way of the IEEE interface or by raising the EXT. HOLD line 102 (see FIG. 3). This mode is available in trigger modes only. The waveform may be restarted by using the trigger signal or an IEEE trigger command. |

The selection of the mode of operation as well as the clock selection is dictated by a mode control word supplied by way of the microprocessor bus MB to the function generator chip. This is a 16 bit word with bit B0 being the least significant bit and bit B15 being the most significant bit. Bits B0 and B1 are decoded for clock selection in accordance with Table 2 below.

TABLE 2

| Bit B0 | Bit B1 | Clock |
| --- | --- | --- |
| 0 | 0 | Invalid |
| 0 | 1 | External clock |
| 1 | 0 | 12.8 MHz |
| 1 | 1 | 10.0 MHz |

As seen from Table 2, bits B0 and B1 of the mode control word may be decoded to select either an external clock which is obtained from the EXT. REF. IN line 42, or a 12.8 MHz clock obtained from oscillator 40 or a 10.0 MHz clock obtained from oscillator 38.

In this same mode control word, bits B4 and B5 determine the mode of operation. Reference is now made to Table 3 below.

TABLE 3

| Bit B4 | Bit B5 | Mode |
| --- | --- | --- |
| 0 | 0 | Preset triggered |
| 0 | 1 | Invalid |
| 1 | 0 | Monitor triggered |
| 1 | 1 | Continuous |

From Table 3 it is seen that the mode control word may be decoded by the arbitrary function generator chip to select preset triggered, monitor triggered or continuous mode of operation.

With reference to FIG. 3, it will be noted that in addition to communicating with the microprocessor section MP, the function generator chip 34 may receive user supplied commands such as EXT. REF. IN on line 42 or EXT. TRIG. IN on line 100 and EXT. HOLD on line 102. In addition to the waveform signal outputs at the 0 ohm output 60 and 50 ohm output 62, there are additional outputs including a SYNC. OUT on line 104, a CURSOR OUT on line 106 and a REF. OUT on line 108, all of which may be supplied to the user. These external inputs and outputs to the function generator chip 34 may be better understood with reference to Table 4 below before considering the detailed circuitry in FIG. 4.

TABLE 4

| | |
| --- | --- |
| CURSOR OUT | The CURSOR OUT signal is a TTL compatible, positive-going pulse which is coincident with a particular data point at a preprogrammed cursor address. This cursor address is supplied under processor control to the arbitrary function generator chip by way of the microprocessor bus MB and when the operation is such that the waveform point corresponding to this cursor address is being generated, the CURSOR OUT signal will be placed on the CURSOR OUT line 106 (FIG. 3). |
| SYNC OUT | This is a TTL compatible, positive-going pulse, with its leading edge being coincident with each STOP address of the output waveform. If a full block of the waveform is being generated this signal will rise at address 255 and will fall at address 0. In a triggered mode of operation, this signal will rise and remain high until the waveform generator is triggered (coincident with a START address). The signal will appear at the end of each cycle of a triggered burst. The signal appears on the SYNC OUT line 104 (FIG. 3). |
| EXT. HOLD | When the function generator is in its |

TABLE 4-continued

| | |
| --- | --- |
| | triggered mode, and an EXT. HOLD input is obtained by way of line 102 (FIG. 3), the output waveform is held at its present voltage level and the microprocessor is interrupted. The waveform will be resumed from the point at which it was held by way of a signal received from either the EXT. TRIG. input line 100 or by way of the microprocessor through the IEEE interface bus. |
| EXT. TRIG. IN | When the function generator is in its trigger mode of operation and this signal is received on input line 100 (FIG. 3), the output waveform will be initiated such as after a microprocessor interrupt as discussed immediately above. |
| EXT. REF. IN | This is a user supplied clock input on line 42 for purposes of having the function generator operate with an external clock EXT. CLK. which will then be used instead of the 10.0 MHz clock or the 12.8 MHz clock. This clock will then become the master clock (MCLK) for internal operation. |
| REF. OUT | This is the master clock MCLK (reference clock) which is used internally by the function generator and may be outputted to the user by way of output line 108 (see FIG. 3). |
| 0 ohm output | This is an output which presents less than a 1 ohm source of the generated waveform and is taken directly from the output amplifier at output terminal 60 (FIG. 3). |
| 50 ohm output | This output is the 50 ohms source of the generated waveform. This is a program selectable output and requires that the control signal be outputted from the function generator to effectively close switch 66 to activate the 50 ohm output terminal 62 (FIG. 3). |

The arbitrary function generator 34 is illustrated in detail in FIG. 4 to which the following description is primarily directed. The function generator interfaces with the microprocessor section MP (FIGS. 1 and 2) by way of the microprocessor external bus MB. This bus includes a 16 bit address bus AB, a 16 bit data bus DB and a ulti-line control bus CB. The address bus AB and the ontrol bus CB connect to the waveform generator at a microprocessor interface 200. This interface serves to decode the microprocessor generated control signals and addresses and then supplies WRITE commands or READ commands to the various functional blocks of FIG. 4 as the case may require. Thus, the interface 200 has a plurality of WRITE command outputs 202, each of which serves as a WRITE command input the required functional block so as to enable that block to receive data from the microprocessor data bus DB. Similarly, the interface supplies READ commands at its READ command outputs 204, each directed the required blocks at which data is to be read and placed on the microprocessor data bus. Ten bits of the address bus AB are also supplied directly to an input INA of a function RAM address selector 206. This address selector uses either the 10 bit address obtained from the address bus AB for addressing the function RAM 36 (FIG. 3) or 10 bits received from a function RAM counter address bus 208 which are applied to a second input INB. The choice as to which address is routed to the function RAM address bus 80 and thence to the function RAM 36 depends on whether a WRITE command (used only as an enable) from the microprocessor interface 200 is supplied to the select input 210 of selector 206. Whenever the selector input 210 is raised, then the address obtained from the address bus AB and supplied to input INA is outputted on the function RAM address bus 80, otherwise the address obtained from address bus 208 and applied to input INB is selected as the function RAM address.

During the period of loading waveform data into the function RAM 36, the microprocessor MP will select the waveform or waveforms stored in its memories 16 and 18 and will place that data on its data bus as a sequence of 256 data words. Each data word represents the amplitude or Y value of the waveform and one of 256 sequential addresses (or X values). It is prior to this period that the processor raises the select line 210 of the address selector 206 so that at each address a 16 bit data word from the data bus DB will be written into the addressed location of the function RAM 36. Up to four blocks of data, each 256 addresses long, each representative of either a fixed or user programmed waveform may be entered into the function RAM 36. The READ/WRITE input 37 in the function RAM (see FIG. 3) may be lowered by the interface 200 when data is being written into the function RAM at the address locations. Otherwise, data is being read from the addressed location.

In addition to loading the function RAM 36 with data from the microprocessor section MP, various parameters are loaded into various registers within the function generator before commencing operation to generate a waveform. This includes the mode control word discussed previously, which under processor control is placed on the data bus DB and is written into a command word register 220 when this register receives a microprocessor WRITE command at its input 222 from one of the WRITE command outputs 202 of the interface 200. This mode control word has 16 bits. The command word register serves to select which clock shall be in operation as well as to select the mode of operation in effect. As will be recalled from Tables 2 and 3, the clock select data is located in the control word at bits B0 and B1. This data is supplied to a master clock select logic circuit 224 by way of a clock select data bus 226, which may be a two-wire bus providing binary levels at bits B0 and B1. Similarly, the mode control data at bits B4 and B5 is supplied by register 220 by way of a two-line mode data bus 228 to a trigger and hold logic circuit 230.

The master clock select logic circuit 224 includes logic for decoding bits B0 and B1 of the mode control word in accordance with Table 2 to select as its output clock, referred to hereinafter as the master clock MCLK, as either the 12.8 MHz clock or the 10 MHz clock or the external clock EXT. CLK. Normally, the master clock will be that of the the 10 MHz clock, as the 12.8 MHz clock is used for interpolation operation and the external clock is the user supplied clock. The master clock MCLK serves as the basic timing clock within the function generator, and, for example, the incremental rate at which addresses are generated for addressing the function RAM 36 will be synchronized to the master clock.

The trigger and hold logic circuit 230 decodes the mode control word bits B4 and B5 in accordance with the Table 3 to select the mode of operation as being either preset triggered, monitor triggered or continuous. In the continuous mode, the function generator will continuously output the selected waveform. Additionally, during this mode, the trigger or hold inputs from the microprocessor interface or from external inputs commanding either trigger or hold operations will have no effect. However, if bits B4 and B5 of the mode control word are decoded so that the mode of operation is triggered, either preset or monitoring, then the waveform generator will remain idle until a trigger signal is received from either an external input or from the microprocessor interface so as to commence operation. The trigger and hold logic 230 also receives a STOP input from a cycle compare circuit once a predetermined number of cycles has been counted, and this or a HOLD command received either from an external input or from the microprocessor interface will cause the trigger and hold logic circuit to shut off the master clock MCLK. Additionally, the trigger hold and logic circuit 230 has a trigger load output which it raises to reset the cycle counter so that it is conditioned for counting cycles during a triggered mode of operation.

The command word register 220 also inspects bit B2 of the mode control word which selects whether a smoothing operation (interpolation) is to take effect. If so, the control word register will raise its interpolate/-noninterpolate output 240 to enable operation of a digital interpolator to be discussed hereinafter.

In addition to loading the command word register 220, the processor section also controls the loading of the various additional parameters prior to waveform generation. This includes loading a sample time control word into a sample time and range register 250, a cycle count word in a cycle count register 252, an amplitude control word in an amplitude data register 254, a relay control word in a relay data register 256, a START control word in a START address register 258, a STOP control word in a STOP address register 260 and a cursor control word in a cursor address register 262. The purpose of these control words and registers and associated circuitry will be described below.

Under processor command, the sample time and range control word is loaded into the sample time register 250. This is supplied to a sample time and range divider counter circuit 264 which receives the master clock MCLK from the master clock select circuit 224 and serves to divide down the master clock for different programmable ranges in accordance with the sample time control word. This then provides the address clock ADCLK which is synchronized to the master clock MCLK for developing function RAM addresses by a function RAM address counter to be discussed hereinafter. Additionally, the sample time and range divider counters 264 may, during smoothing or interpolating operations, divide down the master clock MCLK by a factor of 128 to provide an address clock ADCLK. An interpolator clock ICLK will be provided which is 128 times faster than the ADCLK. Thus, the divider counters 264 operate in conjunction with the programmable control word that is supplied to register 250 to divide down the master clock MCLK with different programmable ranges. The counters will automatically load and reload on the fly to accomplish this.

Under microprocessor control, a cycle count control word is loaded to the cycle count register 252. This is used during the preset trigger mode and the register will contain a programmable control word that defines the predetermined number of cycles of operation to be in effect. To accomplish this, the function generator includes a cycle counter 266 which is reset at input 268 to a count of zero by a trigger load pulse at the commencement of waveform generation in the continuous mode and on receipt of a trigger command during the trigger mode of operation. The cycle counters 266 is synchronized to the master clock and counts the number of cycles of the output waveform since the trigger load pulse was received at input 268. At the end of each cycle, a SYNC OUT pulse is supplied to an input 270 of the counter and it is these pulses that are counted by the cycle counters. The output count of the cycle counters 266 is available on a 10 bit cycle count data bus 272 which is supplied to the B input of a cycle count comparator 274. The cycle count comparator compares the count supplied at input B with the programmed cycle count in register 252 which is applied to input A of the comparator. When the counts are equal, the comparator issues a STOP command at its output line 276 and this is applied to the trigger and hold logic circuit 230 to turn off the master clock MCLK to define the end of a predetermined number of cycles. This comparator will stop waveform generation in the triggered mode.

The cycle counter 266 is capable of counting to a count of 9,999 cycles and this counting takes place regardless of the mode of operation. Under processor control, the present count may be loaded into a cycle status register 280 upon raising the microprocessor READ command from the interface to the register. This places the cycle count on the microprocessor data bus DB so that the count may be used by the microprocessor as for providing a comparison number of waveform cycles for testing purposes.

When the function RAM 36 is being loaded with data points making up a waveform, the location at which the data is written into the memory is obtained from the address bus AB whereas the data itself (the Y value) is obtained from the microprocessor data bus DB. This data, under processor control, is first loaded or buffered into a write to function command tristate buffer 282 which, when selected by a command from the microprocessor interface 200 serves to buffer these data points and place them on the function RAM data bus 82 to be written into the function RAM 36. When the data points are being read out of function RAM 36, they are also placed on the function RAM data bus 82 within the arbitrary function generator 34. This outputted waveform data on bus 82 is supplied to a digital interpolator 284 when interpolation or smoothing operations are being conducted. In such case, the digital interpolator will be enabled by the command word register 220 raising its output line 240. When the digital interpolator 284 is enabled, it receives data points from the data bus 82 and provides an interpolation between adjacent data points. This is a smoothing operation and takes place at the clock rate ICLK and serves to insert 128 points between each function RAM data point. These 128 data words, then, are inserted between successive data words obtained from bus 82 and are placed on the output data bus 44 which supplies the data points as well as the interpolated data points to the function digital-to-analog converter 46 (see FIG. 3). If interpolation is not in effect, a tristate buffer 288 is enabled to pass only the data points obtained from the function RAM by way of bus 82 via output data bus 44. However, in this mode, only the eight most significant data points are used. The remaining bits are each at a zero level.

Returning now to the loading of parameters in the registers, an amplitude control word will be loaded, under command from the interface, into the amplitude data register 254. This data word is supplied by way of bus 50 (see FIG. 3) to the amplitude control digital-to-analog converter 48 for scaling the analog output signal from the converter 46 in accordance with the value of the data word programmed into register 254. This provides a means to achieve user programmed scaling of the output waveform. The offset programming is written directly into a register located within the offset digital-to-analog converter 54 from the microprocessor data bus as illustrated in FIG. 3. In this manner, the function generator system provides programmable amplitude and programmable offset control of the output waveform.

The data bus DB also supplies a relay data control word which, under command from the interface 200, is written into a relay data register 256. This data word is used for control of output selection and for self-testing purposes. Thus, in terms of output selection, this data word controls the closing of switch 66 (see FIG. 3) so that the 50 ohm output 62 is effective. Additionally, when the switch 66 is closed and a switch 67 is closed then a self-test function may be obtained by enabling the analog-to-digital converter 70 (FIG. 3) from interface 200 to start converting the 50 ohm output waveform into digital data to be supplied to the microprocessor data bus for use in the self-testing analysis of the system.

A full block of data points for a waveform will include 256 X addresses. In some cases, a waveform to be generated may take less addresses than a full block. In this case the waveform to be generated will commence at a programmed START address and will end at a programmed STOP address. In the case of a full block, the programmed START address will be an address 0 and a programmed STOP address will be at address 255. The programmed START address will, on command from the interface 200, be loaded from the data bus DB into the START address register 258. The START address word, on command, sets a function RAM address counter 300 to an initial START address. This address is made available on the function RAM counter address bus 80 by way of the function RAM address selector 206.

During the operation of reading the function RAM, the address selector 206 supplies addresses to the address bus 80 from the counter address bus 208 and these are taken from the output of the function RAM address counter 300. Consequently, the initial address as clock pulses are supplied to the address counter 300 will be that of the START address. Thereafter, the counter 300 is incremented through the remaining 255 addresses if a full block has been selected (i.e., the starting address is at 0 location). These sequentially incremented addresses are supplied to the address bus 80 to sequentially address the function RAM 36. The function RAM, then, will be addressed at a rate dependent upon the clock frequency of incrementing counter 300. This may be the frequency of the master clock MCLK or may be varied in accordance with the programmed sample time control word supplied to the sample time register 250, which is used by the divider counter 264 to divide down the master clock by different programmable ranges providing an address clock ADCLK. The incrementing of the counters 300 by the address clock ADCLK is synchronized to the master clock MCLK.

The end of a cycle will be dictated by a STOP address word which, on command from the interface, is loaded into the STOP address register 260 from the microprocessor data bus DB. A STOP address word defines the STOP address in the function RAM of the end of a cycle. If a single full block is to be generated, then, the STOP address will be at address 255. If the waveform to be generated takes less than a full block, then, the STOP address may be an address between 0 and 255. This is a programmable address. Up to four blocks or 1,024 addresses may be stored in function RAM 36. If four blocks of data are stored, they may be linked together during waveform generation as by defining a STOP address up to 1,023.

The end of a cycle is defined by comparing the STOP address word in register 260 with the count of the address counter 300 as it appears on the function RAM counter address bus 208. These are compared with an end of cycle comparator 302 and when a comparison is achieved, the comparator provides a SYNC OUT signal which appears on output line 104 (see FIG. 3) and, in addition, is supplied to the cycle counters 266 to increment the cycle count.

A CURSOR OUT signal on line 106 (see FIG. 3) is available at the time that a specific programmable data point is being generated. This is accomplished by loading a cursor address word in the cursor address register 262 on command from the interface. When this programmable address compares with that on the counter address bus 208, a cursor address comparator 304 raises the CURSOR OUT line 106.

Interpolator

The digital interpolator 284, when enabled, serves to provide intermediate values between successive data points on the waveform in order to provide a smoothing function. Whether or not such a smoothing operation takes place is dependent upon the bit pattern in the mode control word initially loaded into the command word register 220 (FIG. 4). Thus, register 220 inspects bit B2 of the mode control word and if this bit is high, then a smoothing operation (interpolation) is to take effect. Otherwise, no smoothing operation is involved. If a smoothing operation is to take effect, the command word register 220 will raise its interpolate-noninterpolate output 240 which enables operation of the digital interpolator 284.

Additionally, when smoothing is called for by the command word register 220, the master clock select logic circuit 224 will select the internal clock of 12.8 MHz as the master clock MCLK which is supplied to the sample time counters 264. As previously brought out herein, the interpolator clock ICLK operates at a rate which is 128 times faster than the address clock ADCLK. Both of these clocks are supplied along with the master clock MCLK to the digital interpolator 284. As will be seen during interpolation operations, the timing is dictated by the faster interpolator clock ICLK.

During the interpolation mode of operation, the digital interpolator 284 will receive the waveform data points outputted from the function RAM 36 by way of the data bus 82. Each waveform data point received from the data bus 82 takes the form of a 16 bit data word. During interpolation, the interpolator serves to insert into the data stream on output bus 44, 128 linear data points between two consecutive waveform points obtained from data bus 82. All of these data points including the waveform data points and the interpolator data points are converted in succession by the function digital-to-analog converter 46 to obtain analog signals.

As previously brought out, the mode control word in register 220 dictates whether the generation of a waveform is to be in the interpolation mode of operation or in the noninterpolation mode of operation. This is based on inspection of bit B2 of the mode control word. If interpolation takes place, the interpolation or smoothing operation may be over the length of a waveform, which as brought out hereinbefore may have 256 data points. However, on occasion it may be desirable that interpolation does not take place through a particular one of those data points. This is to be taken into account during the programming operation prior to loading data points into the function RAM 36. For example, if an amplitude step increase in the Y direction exceeds a point-to-point differential of greater than 64, in the units of measure being considered, it may be desirable to provide no interpolation through that data point. In such case, this is indicated in the 16 bit data word contained in the function RAM for that data point. Each of these data words has 16 bits B0 through B15 with the least significant bit being B0. When bit B0 is set low (i.e., a binary 0 level), this is indicative that no interpolation will be done through that given data point. However, if bit B0 is set high (a binary "1" level), then interpolation will be done through that data point. The most significant bit B15 is a sign bit which is set low for those portions of the waveform that have a positive going slope and is set high for those portions of a waveform having a negative going slope. This will be discussed in greater detail hereinafter.

This leaves for consideration bits B1-B15 of each data word obtained from the function RAM 36. These are each broken into two fields with bits B1-B7 in one field and bits B8-B15 in the second field. The second field, bits B8-B15, contains the functional data point F(x) when the system is operating in the noninterpolating mode of operation (when the mode control word has bit B2 is set at a low level). This field also contains the differential data D (x+1,x) when the system is in the interpolation mode of operation but no interpolation is desired through this particular data point. However, during the interpolation mode of operation and when interpolation operation is desired through the given data point then this second field will contain all zeros.

Part of the interpolation operation involves dividing the differential data by 128 to obtain 128 interpolated data points between two successive data points obtained from the function RAM 36. This is accomplished in accordance with the preferred embodiment of the invention by shifting the differential data, D(x+1,x) from the second bit field (bits B8-B15) to the first bit field (bits B1-B7). This is the equivalent of a shift of seven bits and accomplishes a division by a factor of 128. This shifted field will then be called the interpolation field S(x+1,x) in the interpolation mode of operation, where D=128S.

All of the data discussed above is preloaded into the function RAM 36 as 16 bit words under processor control in the manner as discussed hereinbefore. The foregoing discussion involving interpolation has been given with respect to interpolation taking place on a positive going slope of a waveform; that is, f(x+1) is greater than f(x). When interpolation is desired on a negative going slope of a waveform, when f(x) is greater than f(x+1), then the differential data, D(x+1,x) and the interpolation data, S(x+1,x) must be represented in a sign extended twos complement format. It is for this reason that bit B15, the most significant bit, of the data word obtained from the function RAM 36 serves as a sign bit.

Figure 5:
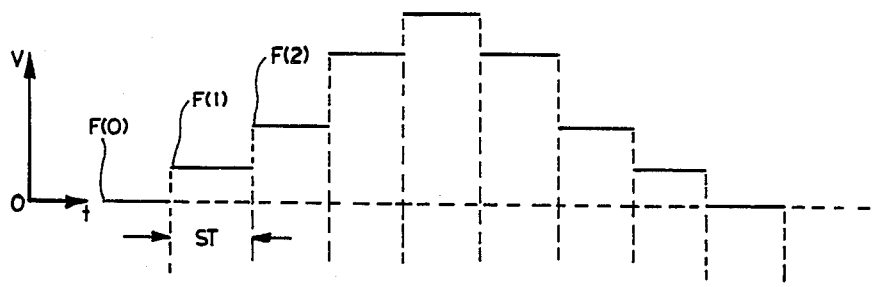
FIG. 5 is a waveform illustrating an output waveform generated without interpolation between data points.
Figure 6:
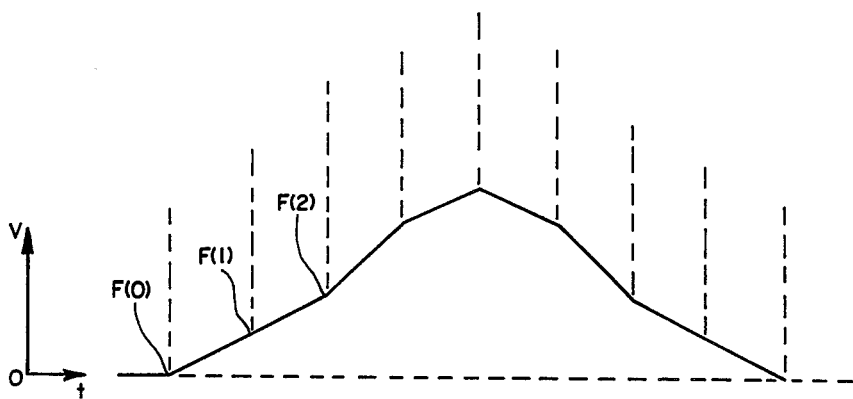
FIG. 6 is a waveform corresponding with that of FIG. 5 but illustrating the operation that ensues with interpolation between data points.

Reference is now made to FIGS. 5 and 6. In the absence of interpolation, the output waveform from the waveform generator will appear as is illustrated in FIG. 5. Thus, the data words outputted from the function RAM 36 is converted by the digital-to-analog converter circuitry to obtain discrete voltage levels. Each level has a magnitude in accordance with digital information in each of the 16 bit data words outputted from the function RAM. Each level also has a duration in accordance with the sample time ST that the discrete voltage level is present. FIG. 5 illustrates a waveform of discrete voltage levels for data points f(0), f(1), f(2), etc.

FIG. 6 illustrates the same waveform but with interpolation between the data points. In this case, the digital data words obtained from the function RAM are applied to the digital interpolator 284 which inserts 128 linear data points between two consecutive waveform data points over the sample time ST. With a minimum sample time for interpolation operations of 20 microseconds, then, the time between each of the interpolation points will be 156.25 nanoseconds. Real time interpolation is accomplished herein by an implementation that employs digital divider/adder technology. This will permit interpolation on the fly. Interpolation is accomplished by shifting the difference between two consecutive functional data points f(x) and f(x+1) by seven bits. This is the equivalent of dividing by 128. Then, each increment is iteratively added to the function point f(x) 128 times. This may be seen by the following equations:

$$D(x+1, x) = F(x+1) - F(x) \quad (1)$$

$$S(x+1, x) = D(x+1, x)/128 \quad (2)$$

$$F(x+1) = F(x) + 128 \, S(x+1, x) \quad (3)$$

Interpolated output =

$$F(x) + iS(x+1, x); \quad (4)$$

where i = iteration steps.

The first interpolated point =

$$F(x) + S(x+1, x) \text{ for } i=1 \quad (5)$$

The second interpolated point =

$$F(x) + 2S(x+1, x) \text{ for } i=2 \quad (6)$$

After 128 iterations, Output =

$$F(x) + 128 \, S(x+1, x) = F(x+1) \text{ for } i=b \; 128 \quad (7)$$

$$F(x+1) = F(x) + 128 \, S(x+1, x) \quad (8)$$

Figure 7:
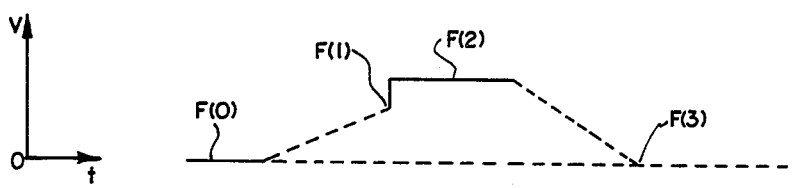
FIG. 7 is a graphical illustration similar to that of FIG. 6 but illustrating the operation that ensues with no interpolation through a specific sample time.

The waveform of FIG. 6 illustrates interpolation throughout all of the data points F(1), F(2), etc. of a waveform which may, for example, have upward of 256 data points. However, it is sometimes desirable during the interpolation mode of operation that no interpolation take place through a particular data point. FIG. 7 illustrates a waveform for data points F(0) through F(3) where no interpolation takes place through an assigned data point F(2). If interpolation is not desired through a particular data point, such as data point F(2), in the waveform of FIG. 7, then the coding for the data word for that data point will signify that no interpolation is to take place. This is accomplished by setting bit B0 in the data word to a binary 0 level and this will be detected by the circuitry within the digital interpolator 284 so that no interpolation is carried out for that assigned data point.

Figure 8:
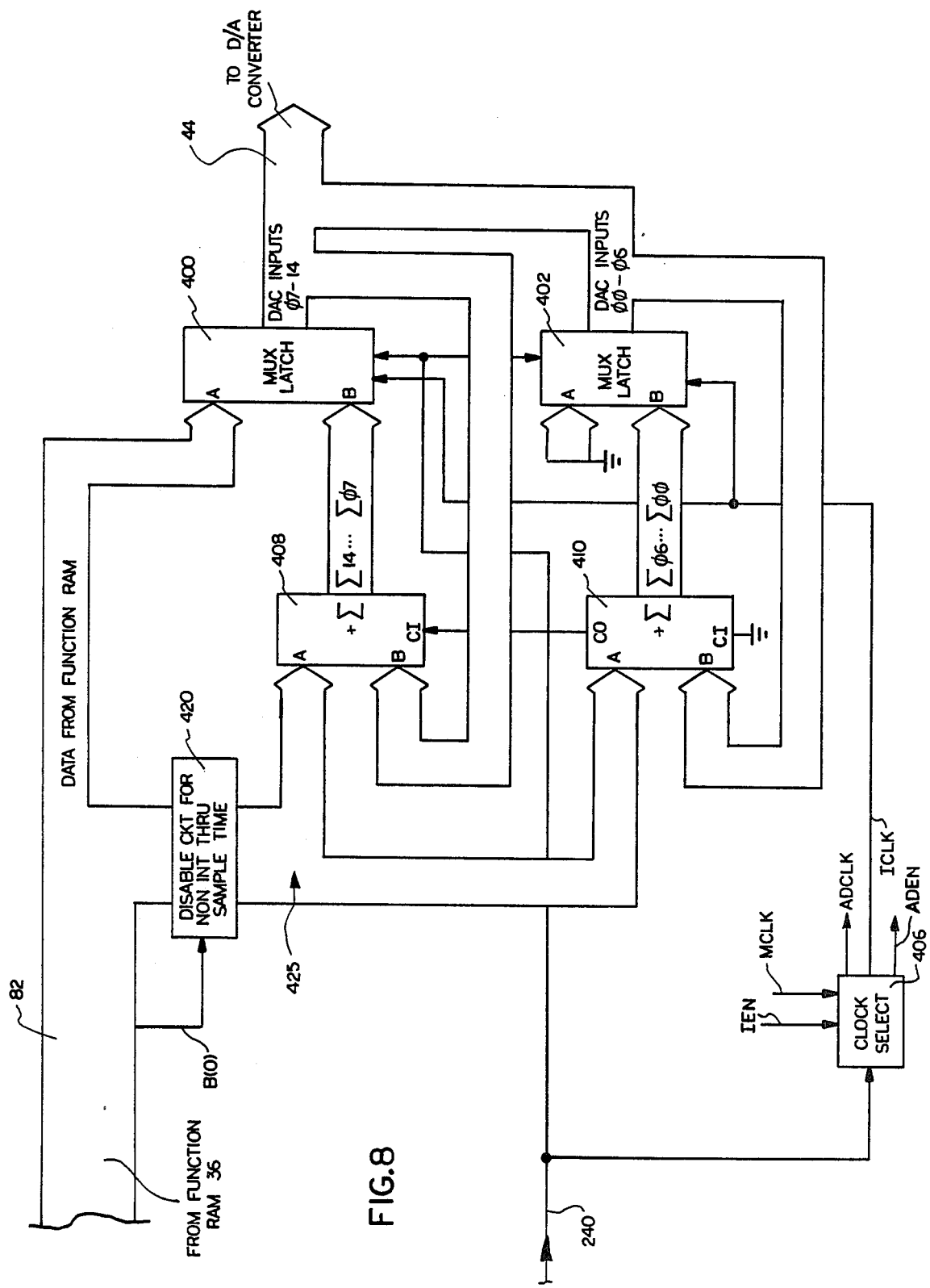
FIG. 8 is a schematic-block diagram illustration of the digital interpolator herein.

The digital interpolator 284 is illustrated in greater detail in FIG. 8 to which attention is now directed. The sixteen bit function RAM data bus 82 supplies each of the data words obtained from the function RAM 36 to the digital interpolator 284. As seen in FIG. 8, the digital interpolator includes a pair of multiplexer latch circuits 400 and 402, sometimes referred to hereinafter as mux-latches. Mux-latches 400, 402 have eight bits and seven bits respectively with the two being combined to define the output data bus 44 which supplies the 15 bit data point to the digital-to-analog coverter circuitry. The eight most significant bits are obtained from mux-latch 400 and the least significant seven bits are obtained from the mux-latch 402. During the noninterpolation mode of operation, mux-latches 400 and 402 are not enabled and only the data supplied to the A inputs of the latches will be passed. All zeros are supplied to the A input of mux-latch 402 by grounding this input. Only the differential data bits B8–B15 of the data word are supplied to the A input of mux-latch 400 during this noninterpolation mode of operation. These eight bits are passed by the mux-latch 400 straight through the digital interpolator 284 to the output bus 44 and, thence, to the digital-to-analog converting circuitry.

During the interpolation mode of operation, the mode control word is inspected by the command word register 220 and if it calls for the interpolation mode of operation the register raises its interpolate-noninterpolate output 240. This enables mux-latches 400 and 402. When these mux-latches are so enabled, they will pass the data supplied to their B inputs. The rate of data flow through the mux-latches 400 and 402 is dependent upon the frequency of clocking the data through the latches. The clock supplied to the latches is ICLK which is synchronized to the master clock MCLK. When in the noninterpolation mode, output 240 from register 220 is low and the clock ICLK is at the same frequency as that of ADCLK. In the interpolation mode when output circuit 240 is raised, clock ICLK is 128 times faster than the address clock ADCLK, obtained from clock generator logic circuit 406, and is used during the interpolation mode of operation. Each clock pulse supplied to the clock input of latches 400 and 402 serves to latch in the data appearing at the inputs.

During the interpolation mode of operation, digital feedback is employed so that the current data outputted from a mux-latch is wrapped around and applied as an input to the B input of adders 408 and 410. The eight most significant bits are supplied by mux-latch 400 to the B input of adder 408 and the least significant seven bits are supplied by mux-latch 402 to the B input of adder 410. The carry out terminal of adder 410 is supplied directly to the carry in terminal of adder 408 so that the two adders, taken together, operate as a single adder.

In the noninterpolation mode of operation, the mode control word is decoded at register 220 and its output line 240 is low, and the clock to the mux-latches is ICLK which is synchronized to the master clock MCLK. The mux-latches pass the data supplied to their A inputs at this rate. All zeros are supplied by mux-latch 402 and the functional point data bits B8–B15 are passed by the mux-latch 400. These are then supplied to the output bus 44 for conversion by the digital-to-analog converter.

In the interpolation mode of operation, the mode control word is decoded by register 220 and it raises its output line 240 to enable the digital interpolator 284. The clock ICLK in synchronism with the MCLK provides the clocking for the mux-latches 400 and 402. These now operate at a rate 128 times faster than ADCLK compared to the noninterpolation mode of operation.

During the normal interpolation mode of operation, data bits B8–B15 from the data bus 82 contain all zeros and the interpolation data is located in the data bits B1–B7. These data bits B1–B7 are supplied to the A input of adder 410. Data bits B8–B15 (all zeros) are supplied to the A input of adder 408. The data bits for the previous function point are present on the output of the mux-latches 400 and 402. This is supplied to the B inputs of the associated adder circuits 408 and 410. Binary addition takes place with the summation being supplied to the B inputs of mux-latches 400 and 402 and latched in by the ICLK. This will continue 128 times or iterations for each sample data point for which interpolation is desired. At the end of 128 iterations, the bit pattern representing the value of the next function point will appear on the output of mux-latches 400 and 402.

Each of the data words on bus 82 are interpolated in the same manner as is discussed above, so long as interpolation is desired. If interpolation is not desired for an assigned data word during the interpolation mode of operation, then the data word on the output bus 82 for that data point will have bit B0 set at a binary 0 or low level. Additionally, the bit fields are arranged such that the differential data D(x+1, x) is located in the second bit field of bits B8–B15 and the first bit field containing bits B1–B7 are all zeros. The differential data is supplied to the A input of adder 408 by way of a disable circuit 420. All zeros are applied to the A input of adder 410. The output of the mux-latches 400 and 402 is at a status representative of the previous function point. In the example as shown in FIG. 7, then, the status of the mux-latches is that of function ooint F(1). The differential data which represents F(2)−F(1) is supplied to the A input of adder 408. Consequently, on the next clock pulse supplied to mux-latches, the value of function point F(1) will be added to the differential data in adder 408. This is supplied and latched into the B input of the mux-latch 400. The output of the mux-latches will jump to that of the value of function point F(2) without going through 128 interpolation points therebetween. The output of the mux-latches will stay at this level for the 128 sample time operation before the next data point is obtained from output bus 82.

During this period the disable circuit 420 examines bit B0 of the data word for the function point F(2) and notes that this is at a binary 0 level. At this point in time, the data comprising the differential data for the function point F(2) has already been supplied to the A input of adder 408. In response to detection of bit B(0) being at a binary 0 or low level, circuit 420 will now supply only zeros to the A input of adders 408 and 410. During the 128 iterations of supplying the ICLK to the mux-latches, the A adder inputs are at a 0 level. Consequently, F(2) will iteratively add 0 to itself 128 times for the F(2) sample time operation.

At the end of the 128 iterations during the F(2) sample time, the output of the mux-latches 400 and 402 will be at a value corresponding with the F(2) function point. Operation may now continue in either the normal interpolation mode of operation as in the case from function point F(0) to F(1), or an operation to again provide noninterpolation through an assigned function point. This will continue until the waveform being generated is complete. Whether or not the next waveform to be generated includes such interpolation operation will be determined by examination of the mode control word on the microprocessor data bus MB as inspected by the command word register 220 in the manner as discussed hereinbefore.

Attention is now directed to the diagram of logic circuitry 499 and flip-flops 500 and 505 in FIG. 9. This diagram illustrates one manner of implementing the clock select circuit 406, in which the clock ICLK is 128 times faster than ADCLK when operating in the interpolation mode and are equal otherwise.

In the interpolation mode of operation the output 240 of the command word register 220 (FIG. 4) will be raised and this will enable AND gate 432 and disable AND gate 430 by way of an inverter 434. DVIEN is low, logic "0", for 128 IEN pulses by way of counter 438. Counter 438 counts up once for every IEN pulse synchronized to master clock MCLK. After 128 counts DVIEN goes high, logic "1", and enables AND gate 432 to pass the 128th IEN pulse to the "D" input of flip-flop 505 by way of OR gate 436. Master clock MCLK clocks the input data to the "Q" output of the flip-flop 505 high, generating ADCLK which may be supplied as the clock input to the function RAM address counters 300 (FIG. 4). IEN is directly passed to the "D" input of flip-flop 500. Master clock MCLK clocks the input data, IEN, to the "Q" output of the flip-flop 500, generating ICLK which is supplied to the clock input of the mux-latches 400 and 402 (FIG. 8). As described herein, 128 ICLK clock pulses are generated for every one ADCLK clock pulse when operating in the interpolating mode; consequently, clock ICLK is 128 times faster than clock ADCLK.

For the noninterpolating mode of operation the output 240 of the command word register 220 (FIG. 4) will be low and this will disable AND gate 432 and enable AND gate 430 by way of an inverter 434. AND gate 430 will pass IEN to the "D" input of flip-flop 505 by way of OR gate 436. IEN is also directly supplied to the "D" input of flip-flop 500. Consequently, master clock MCLK will clock flip-flops 500 and 505 simultaneously generating equal number of ICLK and ADCLK clock pulses respectively as required in the noninterpolating mode.

Attention is now directed to FIG. 10 which illustrates the disable circuit 420 in greater detail. As described previously, this circuit serves to detect bit B0 of the data word obtained from the function RAM data bus 82. In the interpolation mode of operation, data bits B7–B15 will contain the differential data only if no interpolation is to take place through the assigned function point, otherwise these bits are all zeros. Data bits B1–B7 contain the interpolation data (the differential data shifted by seven bits) only during the interpolation mode with interpolation being desired through the function point. During the interpolation mode B0 of the data word will be high or binary 1 level, but when no interpolation is desired through the assigned data point, then, bit B0 of the data word will be at a low or binary 0 level. As this is detected, the differential data is being supplied to the A input of adder 408 and all zeros are supplied to the A input of adder 410. However, once this differential data is clocked through the mux-latch, it is desired that for the next 128 iterations only all zeros are supplied to the A inputs of both adders 408 and 410. This is accomplished by the disable circuit of FIG. 10 in the manner as described below.

Attention is now directed to FIG. 10. The data word on bus 82, from the function RAM 36, contains the interpolation increment when interpolating or the differential data in noninterpolating mode for the next sample point. When bit zero, B0, of the data word is at a binary one "1" level the waveform will be interpolated through the function point and when bit zero, B0, is at a binary zero "0" level, the waveform will not be interpolated through the point. This results in selective interpolating through functional points. The disable circuit accomplishes this and will be discussed in greater detail herein.

At the end of a functional point, i.e., after the programmed counters 265 in circuit 264 (FIG. 4) have counted out the programmed sample time, the ripple carry IEN goes high, "binary one" which is input to the "D" input of flip-flop 460 and to the logic circuitry 499. This logic circuitry 499 is in circuit 264 and is explained in greater detail in the description of FIG. 9. The output ADEN of the logic circuitry 499 goes high every time IEN goes high when in the noninterpolating mode and ADEN goes high after every 128 IEN counts when in the interpolating mode. ADEN is applied to the "D" input of flip-flop 455.

On the next master clock MCLK, ICLK and ADCLK are clocked high and then ADEN and IEN go low, "binary zero". ADCLK clocks bit B0 to the input of flip-flop 470 through flip-flop 440. Since the "D" input of the flip-flop 450 is high, ICLK clocks a zero to the input of the NAND gate 480. The output of NAND gate 480 is forced high, allowing the differential data or interpolating increment from bus 82 to bus 425 which feeds adders 408 and 410 (FIG. 8). On the next master clock, ICLK and ADCLK go low. ADCLK goes high through flip-flop 455 and clocks a high to the "D" input of the flip-flop 465 through flip-flop 445. When next IEN goes high, master clock MCLK clocks ICLK high through flip-flop 460. ICLK Loads the summed data into mux-latches 400 and 402, refer to FIG. 8, and clocks a "1" to the input of NAND gate 480, through flip-flop 450, and hence enabling the "$\overline{Q}$" output of flip-flop 470 to be controlling the output of the NAND gate 480. ICLK also clocks a "1" to the clock input of the flip-flop 470 through flip-flop 465 since the "D" input of the flip-flop 465 is high. The high edge of the clock to flip-flop 470 clocks "B0" at input "D" to the output "Q". The "$\overline{Q}$" output of flip-flop 470 feeds one input of the NAND gate 480 which is "$\overline{B0}$". Since the other input to the NAND gate 480 is high, output "$\overline{B0}$" will control the data flow from bus 82 and to bus 425. For interpolation B0 is binary one "1"; forcing output of NAND gate 480 high which enables the interpolation increment to be routed through AND gates 485 and onto the data bus 425 and to the interpolating summers. The interpolating increment will be summed up 128 times to the functional point F(0) to add up to functional point F(1). For no interpolation B0 is binary zero "0" which forces the output of NAND gate 480 low, "0". This forces zero to be routed to the interpolating summers. Zero will be summed up 128 times to the functional point, F(0) plus the differential data which was already added, which adds up to F(1). OUtput "$\overline{Q}$" of flip-flop 465 clears "Q" output of flip-flop 445. Next ICLK will clear "Q" output of flip-flop 465 to zero; initializing and enabling the disabling circuit for the next functional point.

Although the invention has been described with reference to a specific embodiment, it is to be appreciated that various modifications and arrangements of the components may be made within the spirit and scope of the appended claims.

What is claimed is:

1. A digital interpolator for selectively providing or not providing linear interpolation between successive digital data words, each representing a function point, in a stream of such data words, comprising:
   means for supplying a stream of successive data words, each said data word being a multi-bit word having a control bit designating whether or not interpolation is to take place through that data word, a first bit field containing incremental data representing the value of an interpolation increment to be employed during interpolation when said control bit is at a first level, and a second bit field containing differential data representing the value between successive function points only when the control bit is at a second level indicative of no interpolation through the data word;
   output means for providing a first multi-bit digital output signal having a value initially corresponding with a first of said successive data words;
   means responsive to a second succeeding said data word for determining whether said control bit therein is at said first level or said second level for combining said differential data to said multi-bit output signal to generate the next said output signal, when said control bit is at said second level, so as to have a value corresponding with said first output signal plus said differential value or for repeatedly combining said interpolation increment over an interpolation interval to said first output signal, when said control bit is at said first level, until the value thereof corresponds with that of said second of said successive data words.

2. A digital interpolator as set forth in claim 1 wherein said output means includes a multi-bit register for providing said output signal, said responsive means includes combining means for receiving the output signal from said register means and one of said first and second bit fields for combining the value of said bit field to that of said output signal to obtain a summation signal, and means for supplying the summation signal to said register.

3. A digital interpolator as set forth in claim 2, wherein said responsive means includes means for selectively supplying said first or second bit field to said combining means in dependence upon the level of said control bit.

4. A digital interpolator as set forth in claim 3 wherein said means for selectively supplying includes means responsive to said control bit being at said second level for supplying said second bit field to said combining means so that said combining means combines said differential data to said output signal and responsive to said control bit being at said first level for supplying said first bit field to said combining means so that said combining means combines said incremental data to said output signal.

5. A digital interpolator as set forth in claim 4 wherein said register means is a clock pulse actuated latch register which latches in the summation signal from said combining means each time it receives a latch clock pulse.

6. A digital interpolator as set forth in claim 5 including means for supplying N latch clock pulses to said latch register during each said interpolation interval so that said latch register latches in the summation signal N times whereupon said interpolation incement is combined N times to said output signal when said control bit is at said first level.

7. A digital interpolator as set forth in claim 6 including disable means, operative when said control bit is at said second level, for supplying said second bit field to said combining means to be combined to said output signal only once during said interpolation interval.

8. A digital interpolator as set forth in claim 7 wherein said disable means supplies said second bit field only at the commencement of said interpolation interval so that said summation signal remains constant of N latch clock pulses.

9. A digital interpolator as set forth in claim 1, wherein said means responsive to the next succeeding said data word includes means for repeatedly adding said interpolation increment N times between successive function points.

10. A digital interpolator as set forth in claim 1, wherein said output means includes multi-bit register means for receiving the output from said combining means, and means for supplying the output of said register means as an input to said combining means so that said combining means repetitively combines said interpolation increment to the output of said register means until the output thereof corresponds with that of said second of said successive data words.

11. A digital interpolator as set forth in claim 10, wherein said register means is a clock pulse actuated latch register which latches in the output from said combining means each time it receives a latch clock pulse.

12. A digital interpolator as set forth in claim 11, including means for normally supplying N latch pulses during each interpolation interval so that said latch register is latched N times and supplies its output to said combining means N times so that said interpolation increment is combined N times to the output of said latch register.

* * * * *